(12) United States Patent
Semmere et al.

(10) Patent No.: US 7,462,976 B2
(45) Date of Patent: Dec. 9, 2008

(54) SMART MATERIAL ACTUATOR

(75) Inventors: Daniel O. Semmere, Mission Viejo, CA (US); Robert W. Ragen, Jr., Mission Viejo, CA (US); Virender Jain, Dove Canyon, CA (US); Daniel C. Massie, Aliso Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 11/619,516

(22) Filed: Jan. 3, 2007

(65) Prior Publication Data

US 2007/0247024 A1    Oct. 25, 2007

Related U.S. Application Data

(60) Provisional application No. 60/755,826, filed on Jan. 3, 2006.

(51) Int. Cl.
H01L 41/08 (2006.01)
(52) U.S. Cl. .................................................. 310/328
(58) Field of Classification Search ................ 310/328
See application file for complete search history.

(56) References Cited

U.S. PATENT DOCUMENTS

| | | | |
|---|---|---|---|
| 3,558,936 A | * | 1/1971 | Horan .................. 310/323.01 |
| 3,614,486 A | | 10/1971 | Smiley |
| 4,318,023 A | | 3/1982 | O'Neill |
| 4,435,666 A | * | 3/1984 | Fukui et al. .................. 310/328 |
| 4,518,887 A | * | 5/1985 | Yano et al. .................. 310/328 |
| 4,769,569 A | | 9/1988 | Stahlhuth |
| 4,952,835 A | | 8/1990 | Stahlhuth |
| 4,976,553 A | * | 12/1990 | Yamaguchi et al. .... 400/124.16 |
| 5,900,691 A | | 5/1999 | Reuter et al. |
| 5,907,211 A | * | 5/1999 | Hall et al. .................... 310/328 |
| 6,273,681 B1 | * | 8/2001 | Yamakawa et al. ............ 416/23 |
| 6,356,007 B1 | | 3/2002 | Silva |
| 6,465,936 B1 | | 10/2002 | Knowles et al. |
| 6,526,864 B2 | | 3/2003 | Lindler et al. |
| 6,715,731 B1 | | 4/2004 | Post et al. |
| 7,026,746 B2 | | 4/2006 | Audren et al. |

* cited by examiner

*Primary Examiner*—Mark Budd
(74) *Attorney, Agent, or Firm*—Renner, Otto, Boisselle, Sklar, LLP

(57) ABSTRACT

A smart material actuator wherein one or more smart material devices are constrained in a frame such that expansion or contraction of the frame effects movement of side frame members away from or towards one another. The side frame members are constrained such that such movement away from or towards one another effects rotational movement of the frame for outputting amplified movement at an output member that rotates with the frame.

15 Claims, 2 Drawing Sheets

SMART MATERIAL ACTUATOR

RELATED APPLICATIONS

This application claims the benefit of U.S. Provisional Application No. 60/755,826 filed Jan. 3, 2006, which is hereby incorporated herein by reference.

FIELD OF THE INVENTION

The present invention relates to smart material actuators.

BACKGROUND OF THE INVENTION

Smart material actuators heretofore have used the expansion/contraction characteristics of a smart material to effect movement of an output member. Smart materials include but are not limited to piezoelectric materials, magnetostrictive materials, electroactive polymers, electrostrictive materials, shape memory alloys, and smart hydrogels. Piezoelectric stacks have often been used as the primary mover in such actuators.

Smart materials typically demonstrate a low percentage of nominal length increase at their maximum excitation. This often presents a need for stroke amplification for many applications including, inter alia, valves for liquid or air flow control, pin actuators for printer heads, control surface actuators for aerospace applications, high-power-density hydraulic pumps, etc.

Several known piezoelectric or electroexpansive actuator devices have been connected with levers and side linkages to produce motion amplification. In those cases, a high force, short stroke expansion or contraction of a piezoelectric actuator is amplified as a lower force, longer stroke movement.

In U.S. Pat. No. 4,318,023, a saggitally amplified mechanism is described in which a lever arm is pivotally connected to a fixed base support and is driven for movement by an electroexpansive actuator. The end of the lever arm, opposite the pivot end, is connected to one end of a saggital tension member. The opposite end of the saggital tension member is connected to the fixed base support. Upon actuation of the electroexpansive actuator, the lever arm is pivoted to increase the tension on the saggital member and cause the midpoint of the saggital member to be moved in a direction perpendicular to the longitudinal axis defined between the end points of the sagittal tension member. U.S. Pat. No. 4,769,569 shows a piezoelectric stack motor stroke amplifier in which a rigid frame supports a pair of stack motors. The stack motors act in opposition against a movable output actuator to provide an amplified push stroke output actuation.

SUMMARY OF THE INVENTION

The present invention provides a novel and useful smart material actuator wherein one or more smart material devices are constrained in a frame such that expansion or contraction of the smart material devices effects movement of side frame members away from or towards one another, which side frame members are constrained such that such movement away from or towards one another effects rotational movement of the frame for outputting amplified movement at an output member that rotates with the frame.

In particular, the invention provides an actuator assembly comprising a frame structure including a pair of axially spaced apart, laterally extending crossheads and a pair of laterally spaced apart, axially extending side frame members connected between respective ends of the crossheads. The side frame members are laterally deflectable in opposite directions at mid-sections thereof in response to movement of the crossheads toward or away from one another. A smart material device extends axially between the crossheads and is operative upon stimulation to move the crossheads away from or towards one another to cause lateral deflection of the mid-sections of the side frame members away from or towards one another and thereby vary the spacing between the mid-sections of the side frame members. A constraint mechanism is provided on a support to constrain movement of the mid-sections of the side frame members along respective paths but in opposite directions, each path having an axial component such that as the spacing between the side members is varied the frame structure will be caused to be rotated relative to the support. An output member is rotatable with the frame structure for outputting the rotational motion of the frame structure relative to the support.

In a particular embodiment, the constraint mechanism may comprise a pair of rocker arms each having a first end connected to the mid-section of a respective one of the side frame members and a second end pivotally connected to the support at a pivot location axially offset from the pivot connection of the other rocker arm, whereby expansion or contraction of the smart material device will cause the side frame members to deflect in opposite directions to vary the spacing therebetween, which in turn will cause the frame structure to be rotated about a pivot axis by the interaction between the rocker arms and the support.

The smart material device may include one or more axially elongated piezoelectric stacks captured between the crossheads.

Each side frame member may include a toggle linkage connected between the ends of the crossheads. The toggle linkage may be formed by a resiliently flexible blade bowed at its mid-section and connected at its ends to the crossheads. The flexible blade may be clamped to the end of the rocker arm, and the ends of the blades may be fixed in slots in the crossheads by set screws. The blades may be bowed inwards towards the smart material device.

The crossheads may be held under a pre-load against the ends of the smart material device. The pre-load may be effected by high tensile wire wrapped around the crossheads, and the pre-load may be adjustable by means of a wire tensioner drum. Alternatively or additionally, the side frame members may be in tension, thereby applying a pre-load to the smart material device.

The output device may include an actuator arm connected to one of the crossheads and extending radially outwardly with respect to the pivot axis of the frame structure such that expansion movement of the smart material device is amplified at the distal end of the actuator arm. The output device may be used to actuate a valve or other control device.

Further features of the invention will become apparent from the following detailed description when considered in conjunction with the drawings.

DETAILED DESCRIPTION

Figure 1:
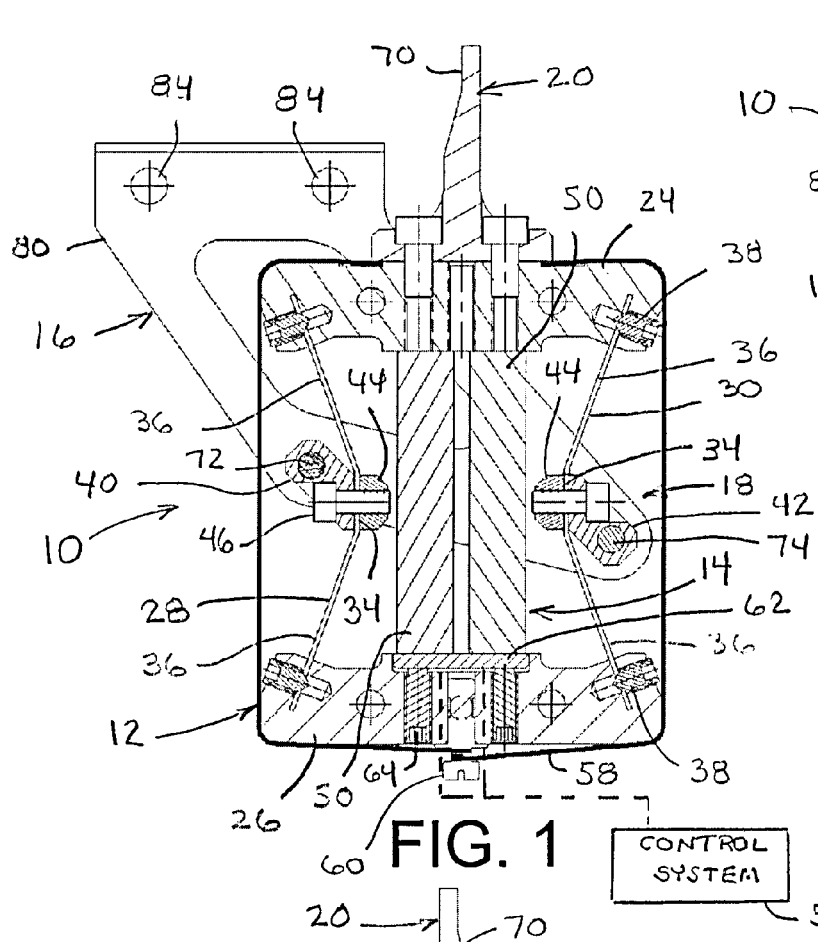
FIG. 1 is a cross-sectional view of an exemplary smart material actuator according to the invention, taken along the line 1-1 of FIG. 2.

Referring now to the drawings in detail and initially to FIGS. 1-5, an exemplary smart material actuator according to the invention is indicated generally at 10. The actuator 10 generally comprises a frame structure (frame) 12, a smart material device 14, a support 16, a constraint mechanism 18, and an output member 20.

The frame 12 includes a pair of axially spaced apart, laterally extending crossheads (beams) 24 and 26 and a pair of laterally spaced apart, axially extending side frame members 28 and 30 connected between respective ends of the crossheads. The side frame members are laterally deflectable in opposite directions at mid-sections thereof in response to movement of the crossheads toward or away from one another. In the illustrated embodiment, the side frame members are formed by resiliently flexible blades bowed at their mid-sections and connected at their ends to the crossheads. As shown in FIG. 1, the blades (which preferably are strap-like members) are bowed inwards towards the electroexpansive device, although they could be bowed outwardly, if desired.

The flexible blades 28 and 30 each may have a central flat portion 34 and inclined arm portions 36. The arm portions 36 may have the distal end portions thereof fixed in slots in the crossheads 24 and 26 by set screws 38. The distal end portions may each have a hole therein for partially receiving and centering to the tapered ends of the set screws to provide for precise positioning of the end portions in the crossheads.

The central flat portion 34 of each blade 28, 30 may be attached to the distal ends of rocker arms 40 and 42 that form part of the constraint mechanism 18 which is hereinafter more fully described. As shown, the central flat portion may be rigidly clamped to the ends of the rocker arms by a clamp nut 44 and bolt 46 that has an unthreaded shoulder portion that extends through a correspondingly sized hole in the central flat portion.

In effect, the flexible blades 28 and 30 form toggle linkages connecting the ends of the crossheads 24 and 26. The midpoints of the flexible blades that are attached to the rocker arms 40 and 42 function as central pivot connections whereas the inclined arms function as the links connected at their distal ends to the crossheads for relative pivotal movement by virtue of the flexibility of the blades. In an alternative exemplary arrangement, the blades could be replaced by toggle linkages consisting of relatively rigid links that are pivotally connected to one another and to the crossheads. A spring or other biasing device may be used to bias the pivot connection of the links toward or away from one another. If the crossheads are forced away from one another upon activation of the smart material device, the pivot connections of the toggle linkages may be resiliently biased away from one another.

The smart material device 14 may comprise piezoelectric materials, magnetostrictive materials, electroactive polymers, electrostrictive materials, shape memory alloys, and smart hydrogels. These materials are capable of expansion or contraction when stimulated. An expansion or contraction axis of the device is aligned axially with the frame 12 such that upon stimulation electrically or otherwise, the expansion or contraction of such material will force the crossheads away from one another or allow the crossheads to move towards one another. This in turn will cause lateral deflection of the mid-sections of the side frame members 28 and 30 away from or towards one another and thereby vary the spacing between the mid-sections of the side frame members.

In the illustrated embodiment, the smart material device 14 includes one or more electro-responsive peizoelectric stacks 50. The stack or stacks 50 preferably are symmetrically arranged relative to the center axis of the frame 12 such that actuation of the peizoelectric stacks will cause the crossheads 24 and 26 to remain parallel as they move away from or towards one another. Other means, however, may be provided to maintain the crossheads parallel to one another, as will be desired in most applications.

A control system, shown diagrammatically at 54 in FIG. 1, typically will include power electronics, a controller and feedback sensors for controlling operation of the electro-responsive piezoelectric stack or stacks, or other smart material device that may be employed. The control system typically will provide voltage for simultaneously energizing the piezoelectric stacks to effect expansion of the stacks along their length, and thus force apart crossheads 24 and 26 between which the stacks 50 are captured.

Figure 2:
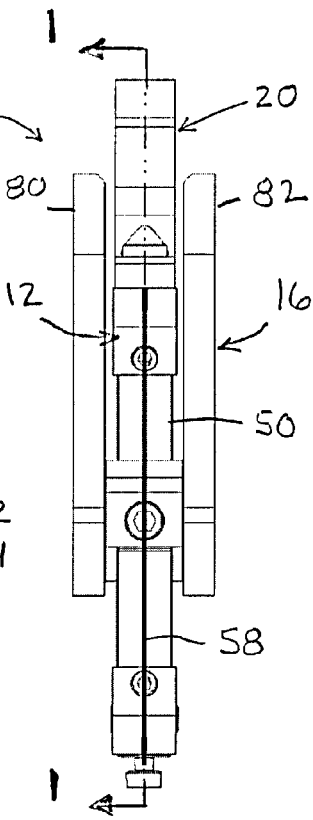
FIG. 2 is a side elevational view of the actuator of FIG. 1.
Figure 3:
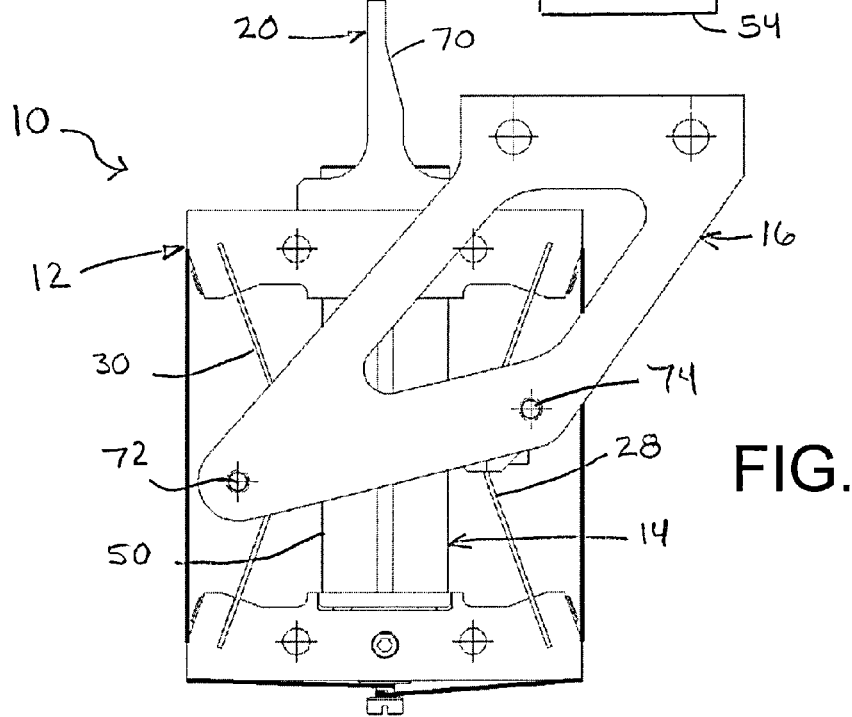
FIG. 3 is a rear elevational view of the actuator of FIG. 1.
Figures 4, 5:
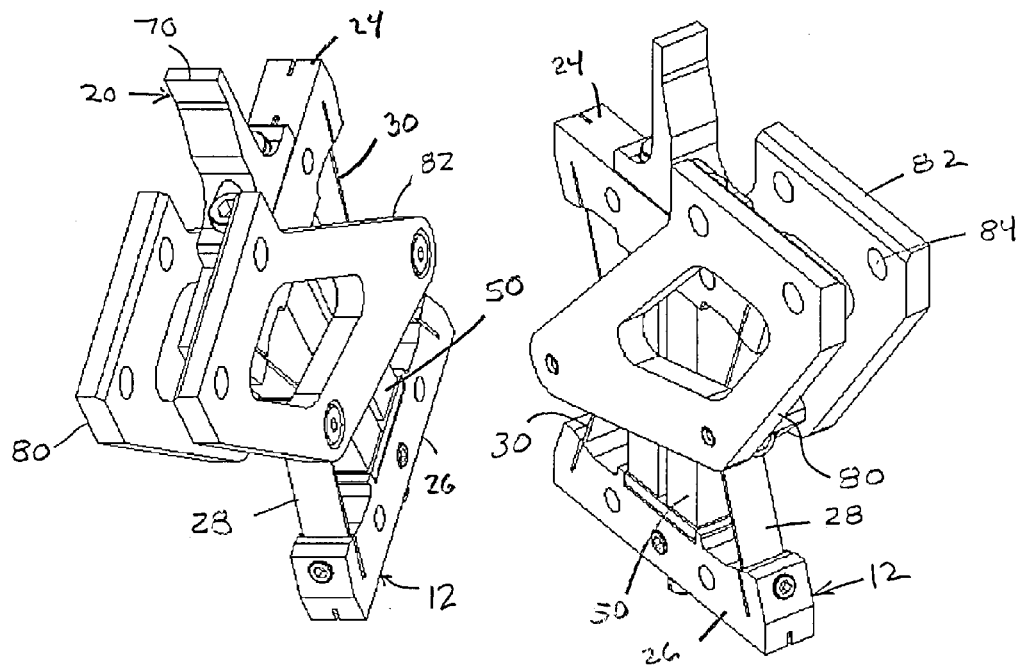
FIG. 4 is a left-hand side perspective view of the actuator of FIG. 1, with a tensile wire removed.
FIG. 5 is a right-hand side perspective view of the actuator of FIG. 1, with the tensile wire removed.

The crossheads 24 and 26 may be held under a pre-load against the ends of the smart material device 14 and particularly the ends of the piezoelectric stacks 50. The pre-load may be effected by a high tensile wire 58 wrapped around the crossheads as shown in FIGS. 1 and 2. The pre-load may be adjustable by means of a wire tensioner drum 60. Alternatively or additionally, the side frame members 28 and 30 may be in tension, thereby applying a pre-load to smart material device 14.

One end of each stack 50 may bear against an abutting surface of one crosshead 24, whereas the other end may bear against an abutting surface of a pressure plate 62 that is supported by other crosshead 26 via one or more set screws 64. The set screws 64 may be adjusted to vary the pre-load acting on the piezoelectric stacks 50. The screws may be adjusted to put the tensile wire 58 and/or side frame members 28 and 30 in tension to adjust the pre-load acting on the piezoelectric stack or stacks.

The constraint mechanism 18 is provided on the support 16 to constrain movement of the mid-sections of the side frame members 28 and 30 along respective paths but in opposite directions. Each path has an axial component such that as the spacing between the side members is varied the frame will be caused to be rotated relative to the support. The output member 20 is rotatable with the frame for outputting the rotational motion of the frame 12 relative to the support 16.

The output member 20 may include, for example, an actuator arm 70 connected to one of the crossheads and extending radially outwardly with respect to the pivot axis of the frame 12 such that expansion/contraction movement of the smart material device 14 is amplified at the distal end of the actuator arm 70.

In the illustrated embodiment, the constraint mechanism 18 comprises the rocker arms 40 and 42. Each rocker arm has a distal end connected to the mid-section of a respective one of the side frame members 28 and 30 and a proximal end pivotally connected to the support 16 at a pivot 72 axially offset from the pivot 74 of the other rocker arm. The pivots 72 and 74 also are axially and outwardly offset from the midpoints of the side frame members in the illustrated embodiment. The pivots 72 and 74 may be formed by shoulder bolts which are connected to the support 16. As shown, the support may be formed by a pair of brackets 80 and 82 that in turn may be mounted to a support structure, for example by bolts (not shown) extending through mounting holes 84. The brackets may be located forwardly and rearwardly of the frame 12. In a particular example, the support 16 may be mounted to a valve body and the output arm may be used to control a valve in the valve body. The output arm, for example, may be used to control a valve poppet or other mechanism for which precise motion and force control is desired.

As a result of the foregoing arrangement, expansion or contraction of the smart material device 14 will cause the mid-sections of the side frame members 28 and 30 to deflect in opposite directions to vary the spacing therebetween, which in turn will cause the frame 12 to be rotated about a pivot axis by the interaction between the rocker arms 40 and 42 and the side frame members. If piezoelectric stacks are electrically excited, they will expand or contract along its axis. For example, a piezoelectric driving member will expand in the direction of the applied electric field with a positive input voltage. In general, the expansion of piezoelectric stack is proportional to the voltage.

Figures 6, 7:
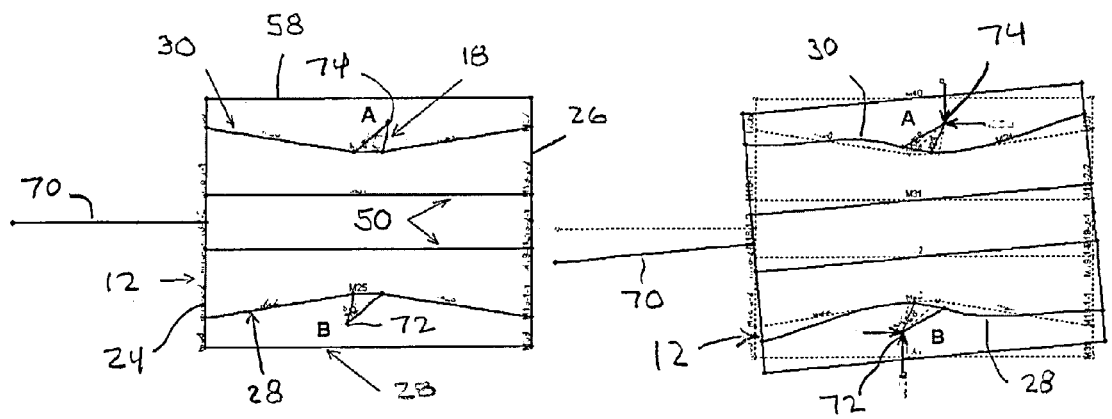
FIG. 6 is a schematic illustration of the actuator of FIG. 1.
FIG. 7 is a schematic illustration similar to FIG. 6, but showing the actuator energized to provide an amplified output.

Referring to FIGS. 6 and 7, as the piezoelectric stacks 50 expand the blades 28 and 30 tend to straighten. As the blades straighten, the rocker arms of the constraint 18 will pivot around their offset pivots axes 72 and 74. Since the blades are attached to the pivoting rocker arms, a resulting bending distortion of the blades occurs (see FIG. 7). The symmetrically opposed bending distortion of the blades maintains parallelism between the two crossheads while rotating the frame 12. This rotation of the frame will rotate the output arm 70 with the motion at the distal end of the output arm being amplified in relation to the axial expansion movement of the piezoelectric stacks 50.

Preferably, the actuator frame 12 is symmetric with respect to the longitudinal axis of the frame. That is, the left-hand and right-hand sides of the frame are mirror images on one another for the most part. In addition, the rocker arms 40 and 42 and their respective pivots 72 and 74 are similarly dimensioned but oppositely offset.

As will be appreciated, the actuator 10 is scalable. The sizes of components of actuator can be adjusted to achieve a desired force and displacement at the output arm. The components can be machined using conventional machining for low manufacturing cost. Expensive EDM processes are not required for component manufacture. The apparatus may be fabricated from steel, aluminum, or other suitable material.

The actuator 10 shown in FIGS. 1-5 is intended to be exemplary of an actuator according to the present invention. As will be appreciated by those skilled in the art, modifications can be made while still utilizing one or more principles of the invention. For example, the constraint mechanism 18 may include a cam and follower mechanism in place of each rocker arm. A cam follower in the form of a pin may be provided on the mid-sections of the side frame members. The pin may extend at right angle to the center plane of the frame for receipt in a cam slot provided in the support. The cam slot, which extends in a direction that at least has an axial component, may be arranged to constrain movement of the pins as the pins are moved toward or away from one another such that the frame will be caused to rotate.

An actuator according to the present invention may be used in many applications including, inter alia, valves for liquid or air flow control, pin actuators for printer heads, control surface actuators for aerospace applications, high-power-density hydraulic pumps, etc.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An actuator assembly comprising:
a frame structure including a pair of axially spaced apart, laterally extending crossheads and a pair of laterally spaced apart, axially extending side frame members connected between respective ends of the crossheads, the side frame members being laterally deflectable in opposite directions at mid-sections thereof in response to movement of the crossheads toward or away from one another;
a smart material device extending axially between the crossheads and operative upon expansion or contraction to move the crossheads away from or towards one another to cause lateral deflection of the mid-sections of the side frame members away from or towards one another and thereby vary the spacing between the mid-sections of the side frame members;
a support;
a constraint mechanism on the support which constrains movement of the mid-sections of the side frame members along respective paths but in opposite directions, each path having an axial component such that as the spacing between the side members is varied the frame structure will be caused to be rotated relative to the support; and
an output member rotatable with the frame structure for outputting the rotational motion of the frame structure relative to the support.

2. An actuator according to claim 1, wherein the constraint mechanism comprises a pair of rocker arms each having a first end connected to the mid-section of a respective one of the side frame members and a second end pivotally connected to the support at a pivot location axially offset from the pivot connection of the other rocker arm, whereby expansion or contraction of the smart material device will cause the side frame members to deflect in opposite directions to vary the spacing therebetween, which in turn will cause the frame structure to be rotated about a pivot axis by the interaction between the rocker arms and the support.

3. An actuator according to claim 1, wherein the smart material device includes an electro-responsive smart material.

4. An actuator according to claim 1, wherein the smart material device includes one or more axially elongated piezoelectric stacks captured between the crossheads.

5. An actuator according to claim 1, wherein each side frame member includes a toggle linkage connected between the ends of the crossheads.

6. An actuator according to claim 5, wherein the toggle linkage is formed by a resiliently flexible blade bowed at its mid-section and connected at its ends to the crossheads.

7. An actuator according to claim 6, wherein the flexible blade is clamped to the end of the rocker arm.

8. An actuator according to claim 7, wherein the ends of the blades are fixed in slots in the crossheads by set screws.

9. An actuator according to claim 6, wherein the blades are normally bowed inwards towards the smart material device.

10. An actuator according to claim 1, wherein the crossheads are held under a pre-load against the ends of the smart material device.

11. An actuator according to claim 10, wherein the pre-load is effected by high tensile wire wrapped around the crossheads.

12. An actuator according to claim 11, wherein the pre-load is adjustable by means of a wire tensioner drum.

13. An actuator according to claim 1, wherein the output device includes an actuator arm connected to one of the crossheads and extending radially outwardly with respect to the pivot axis of the frame structure such that expansion movement of the smart material device is amplified at the distal end of the actuator arm.

14. An actuator according to claim 1, wherein the output device is used to actuate a valve or other control device.

15. An actuator according to claim 1, wherein the side frame members are in tension, thereby applying a pre-load to the smart material device.

* * * * *